(12) United States Patent
Ham

(10) Patent No.: US 11,993,309 B2
(45) Date of Patent: May 28, 2024

(54) DRIVER ASSISTANCE APPARATUS, VEHICLE HAVING THE SAME, AND METHOD OF CONTROLLING VEHICLE

(71) Applicants: Hyundai Motor Company, Seoul (KR); Kia Corporation, Seoul (KR)

(72) Inventor: Seungju Ham, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 336 days.

(21) Appl. No.: 17/469,532

(22) Filed: Sep. 8, 2021

(65) Prior Publication Data

US 2022/0119038 A1 Apr. 21, 2022

(30) Foreign Application Priority Data

Oct. 21, 2020 (KR) .................. 10-2020-0136777

(51) Int. Cl.
*B62D 15/02* (2006.01)
*B60Q 9/00* (2006.01)
*G01S 13/931* (2020.01)

(52) U.S. Cl.
CPC ........... *B62D 15/029* (2013.01); *B60Q 9/008* (2013.01); *B62D 15/0265* (2013.01); *G01S 13/931* (2013.01); *G01S 2013/9315* (2020.01); *G01S 2013/93275* (2020.01)

(58) Field of Classification Search
CPC .. B62D 15/029; B62D 15/0265; B60Q 9/008; G01S 13/931; G01S 2013/9315; G01S 2013/93275
USPC .......................................................... 701/41
See application file for complete search history.

(56) References Cited

U.S. PATENT DOCUMENTS

2019/0056479 A1* 2/2019 Park ..................... G01S 7/4026

FOREIGN PATENT DOCUMENTS

| CN | 108828527 A | * | 11/2018 | ........... G01S 13/931 |
| DE | 102015219780 A1 | * | 4/2016 | ............. G01C 21/26 |
| KR | 1020190097703 A | * | 8/2019 | ............ B60W 30/08 |

* cited by examiner

*Primary Examiner* — Lindsay M Low
*Assistant Examiner* — Omar Morales
(74) *Attorney, Agent, or Firm* — SLATER MATSIL, LLP

(57) ABSTRACT

A driver assistance apparatus includes a first radar sensor having a view of a left rear side outside the vehicle and a second radar sensor having a view of a right rear side outside the vehicle. The first radar sensor is configured to output first detecting data and the second radar sensor is configured to output second detecting data. A controller is configured to process the first and second detecting data, to generate a plurality of detection points based on the processing, to generate a first track and a second track based on the plurality of detection points, to identify a track that is normally detected and a track that is erroneously detected among the first track and the second track, and to warn of a collision in a direction located on the normally detected track.

20 Claims, 9 Drawing Sheets

DRIVER ASSISTANCE APPARATUS, VEHICLE HAVING THE SAME, AND METHOD OF CONTROLLING VEHICLE

CROSS-REFERENCE TO RELATED APPLICATIONS

This application claims the benefit of Korean Patent Application No. 10-2020-0136777, filed on Oct. 21, 2020, which application is hereby incorporated herein by reference.

TECHNICAL FIELD

The disclosure relates to a driver assistance apparatus, a vehicle having the same, and a method of controlling the vehicle, and more particularly, to a driver assistance apparatus that assists a driver's vehicle control, a vehicle having the same, and a method of controlling the vehicle.

BACKGROUND

With the development of automotive technology, there are advantages of traveling long distances but problems also often arise as traffic conditions worsen and traffic jams increase where population densities are high.

To relieve burdens and increase convenience of a driver, recent studies regarding vehicles equipped with an Advanced Driver Assist System (ADAS) that actively provides information regarding a state of the vehicle, a state of the driver, and surrounding conditions are actively ongoing.

Examples of the ADAS equipped within the vehicle include Forward Collision Avoidance (FCA), Autonomous Emergency Brake (AEB), and Driver Attention Warning (DAW).

The driver assistance apparatus may assist a driving of the vehicle as well as assist a parking of the vehicle.

SUMMARY

The disclosure relates to a driver assistance apparatus, a vehicle having the same, and a method of controlling the vehicle. Particular embodiments relate to a driver assistance apparatus that assists a driver's vehicle control, a vehicle having the same, and a method of controlling the vehicle.

An aspect of the disclosure is to provide a driver assistance apparatus capable of assisting a driver while a vehicle is departing from a parking space, the vehicle having the same, and a method of controlling the vehicle.

Another aspect of the disclosure is to provide a driver assistance apparatus capable of preventing a vehicle from colliding in a rear side while the vehicle is departing from the parking space, the vehicle having the same, and a method of controlling the vehicle.

Another aspect of the disclosure is to provide a driver assistance apparatus capable of preventing a false warning of a rear side collision of a vehicle while the vehicle is departing from the parking space, the vehicle having the same, and a method of controlling the vehicle.

Additional aspects of the disclosure will be set forth in part in the description which follows and, in part, will be obvious from the description, or may be learned by practice of the disclosure.

According to an aspect of the disclosure, a driver assistance apparatus includes a first radar sensor mounted to a vehicle and having a view of a left rear side outside the vehicle. The first radar sensor is configured to output first detecting data. A second radar sensor is mounted to the vehicle and has a view of a right rear side outside the vehicle. The second radar sensor is configured to output second detecting data. A controller is configured to process the first detecting data and the second detecting data, to generate a plurality of detection points based on processing of the first detecting data and the second detecting data, to generate a first track and a second track based on the plurality of detection points, to identify a track that is normally detected and a track that is erroneously detected among the first track and the second track, and to warn of a collision in a direction located on the normally detected track.

The controller may be configured to identify a longitudinal distance of the first track based on a distance between the first track and the vehicle and an angle between a driving direction of the vehicle and a direction in which the first track is located and to identify a longitudinal distance of the second track based on a distance between the second track and the vehicle and an angle between the driving direction of the vehicle and a direction in which the second track is located.

The controller may be configured to identify that at least one of the first track and the second track is the erroneously detected track based on a difference between the longitudinal distance of the first track and the longitudinal distance of the second track being within an error range.

The controller may be configured to warn of a collision in the direction in which the first track is located based on the fact that a number of detection points related to the first track is greater than a number of detection points related to the second track.

The controller may be configured to identify a transverse moving speed of the first track based on a distance between the first track and the vehicle and an angle between a driving direction of the vehicle and a direction in which the first track is located and to identify a transverse moving speed of the second track based on a distance between the second track and the vehicle and an angle between the driving direction of the vehicle and a direction in which the second track is located.

The controller may be configured to identify that at least one of the first track and the second track is the erroneously detected track based on a difference between the transverse moving speed of the first track and the transverse moving speed of the second track being within an error range.

The controller may be configured to warn of a collision in the direction in which the first track is located based on the fact that a number of detection points related to the first track is greater than a number of detection points related to the second track.

According to another aspect of the disclosure, a vehicle includes a cluster, a side mirror indicator, and a driver assistance apparatus configured to control the cluster and the side mirror indicator. The driver assistance apparatus may further include a first radar sensor mounted to the vehicle and having a view of a left rear side outside the vehicle. The first radar sensor is configured to output first detecting data. A second radar sensor is mounted to the vehicle and has a view of a right rear side outside the vehicle. The second radar sensor is configured to output second detecting data. A controller is configured to process the first detecting data and the second detecting data, to generate a plurality of detection points based on processing of the first detecting data and the second detecting data, to generate a first track and a second track based on the plurality of detection points, to identify a track that is normally detected and a track that is erroneously detected among the first track and the second track, and to control at least one of the cluster and the side mirror indicator to warn of a collision in a direction located on the normally detected track.

According to another aspect of the disclosure, a method of controlling a vehicle includes outputting first detecting data, by a first radar sensor mounted to the vehicle and having a view of a left rear side outside the vehicle, outputting second detecting data, by a second radar sensor mounted to the vehicle and having a view of a right rear side outside the vehicle. A controller processes the first detecting data and the second detecting data, generates a plurality of detection points based on processing of the first detecting data and the second detecting data; generates a first track and a second track based on the plurality of detection points, identifies a track that is normally detected and a track that is erroneously detected among the first track and the second track, and warns of a collision in a direction located on the normally detected track.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION OF ILLUSTRATIVE EMBODIMENTS

Figure 1:
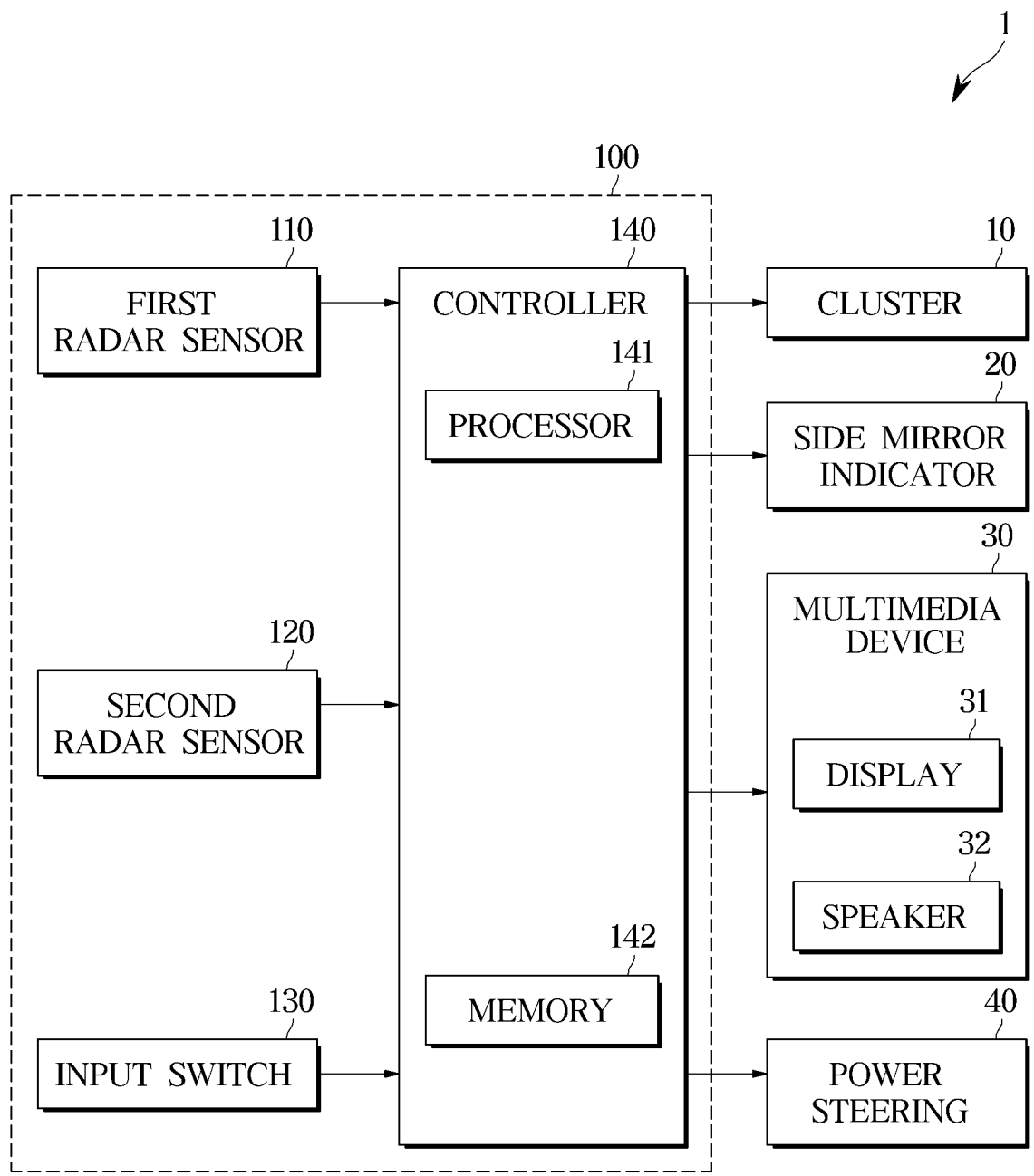
FIG. 1 is a view illustrating a configuration of a vehicle according to an embodiment.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

Reference will now be made in detail to the exemplary embodiments of the present disclosure, examples of which are illustrated in the accompanying drawings, wherein like reference numerals refer to like elements throughout.

The expression, "at least one of a, b, and c," should be understood as including only a, only b, only c, both a and b, both a and c, both b and c, or all of a, b, and c.

Hereinafter, an operation principle and embodiments of the disclosure will be described with reference to accompanying drawings.

Figure 2:
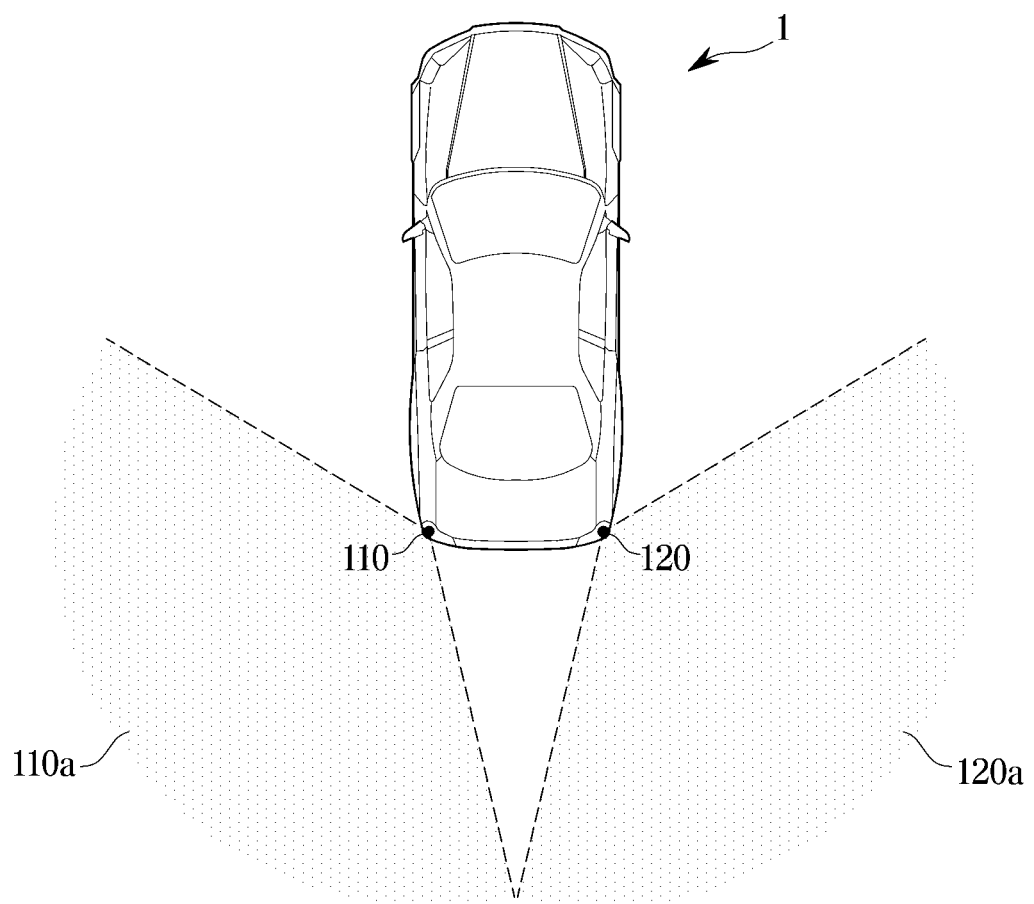
FIG. 2 is a view illustrating an exterior of a vehicle according to an embodiment.
Figure 3:
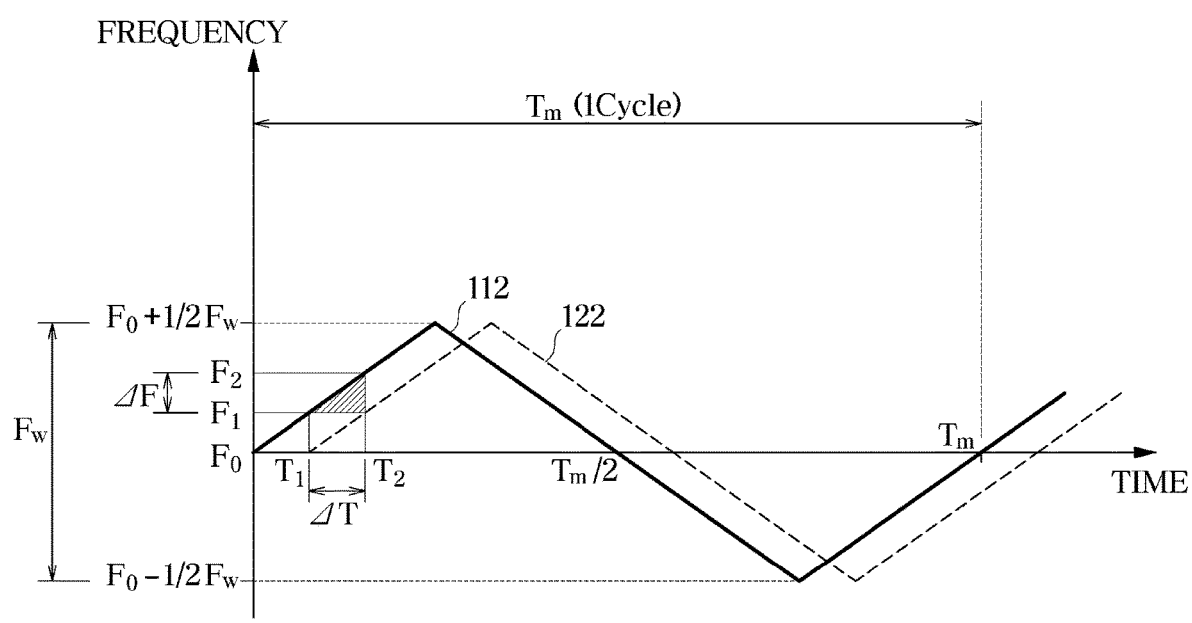
FIGS. 3 and 4 are views illustrating an operation of a radar included in a driver assistance apparatus according to an embodiment.
Figure 4:
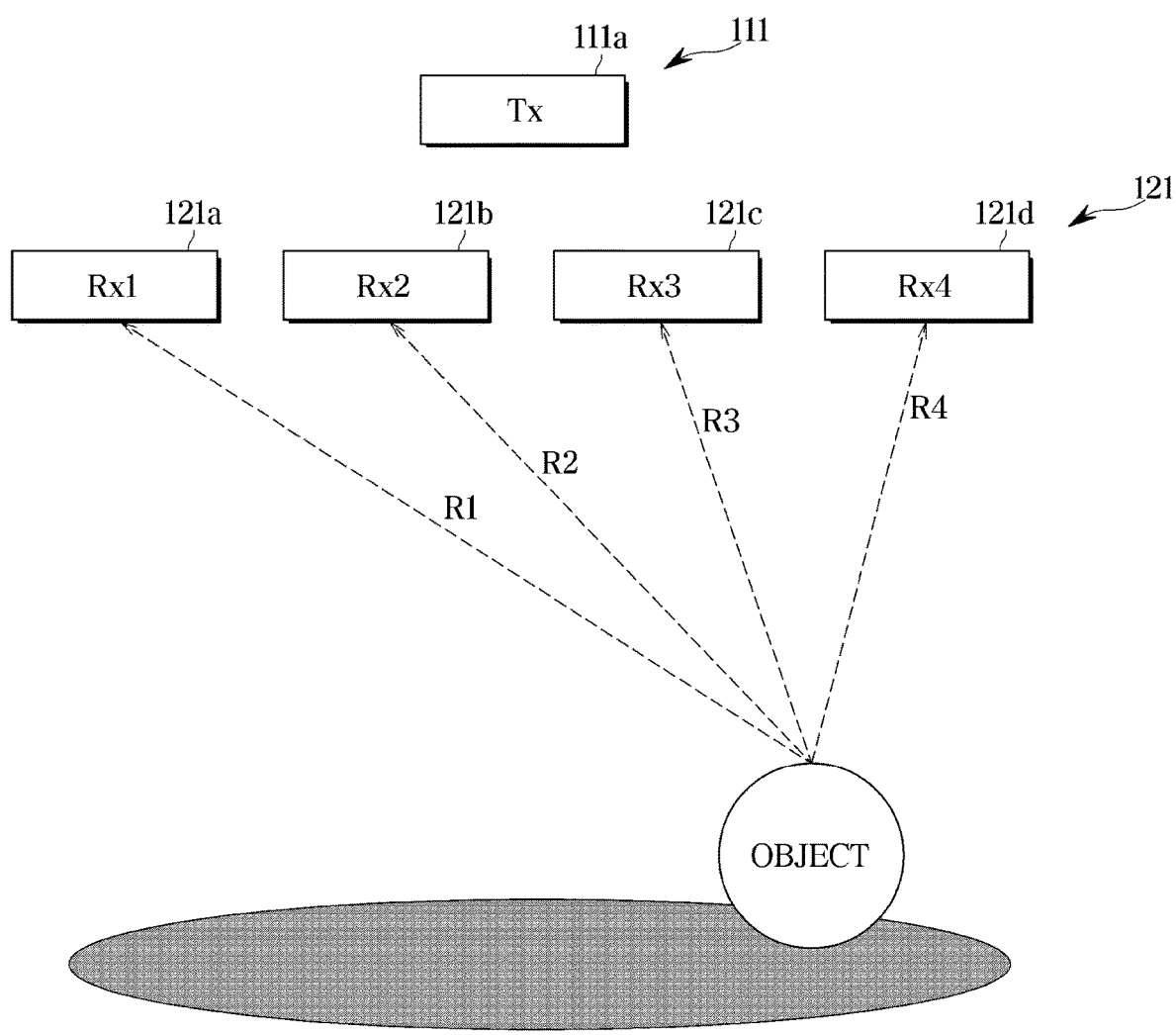
Figure 5:
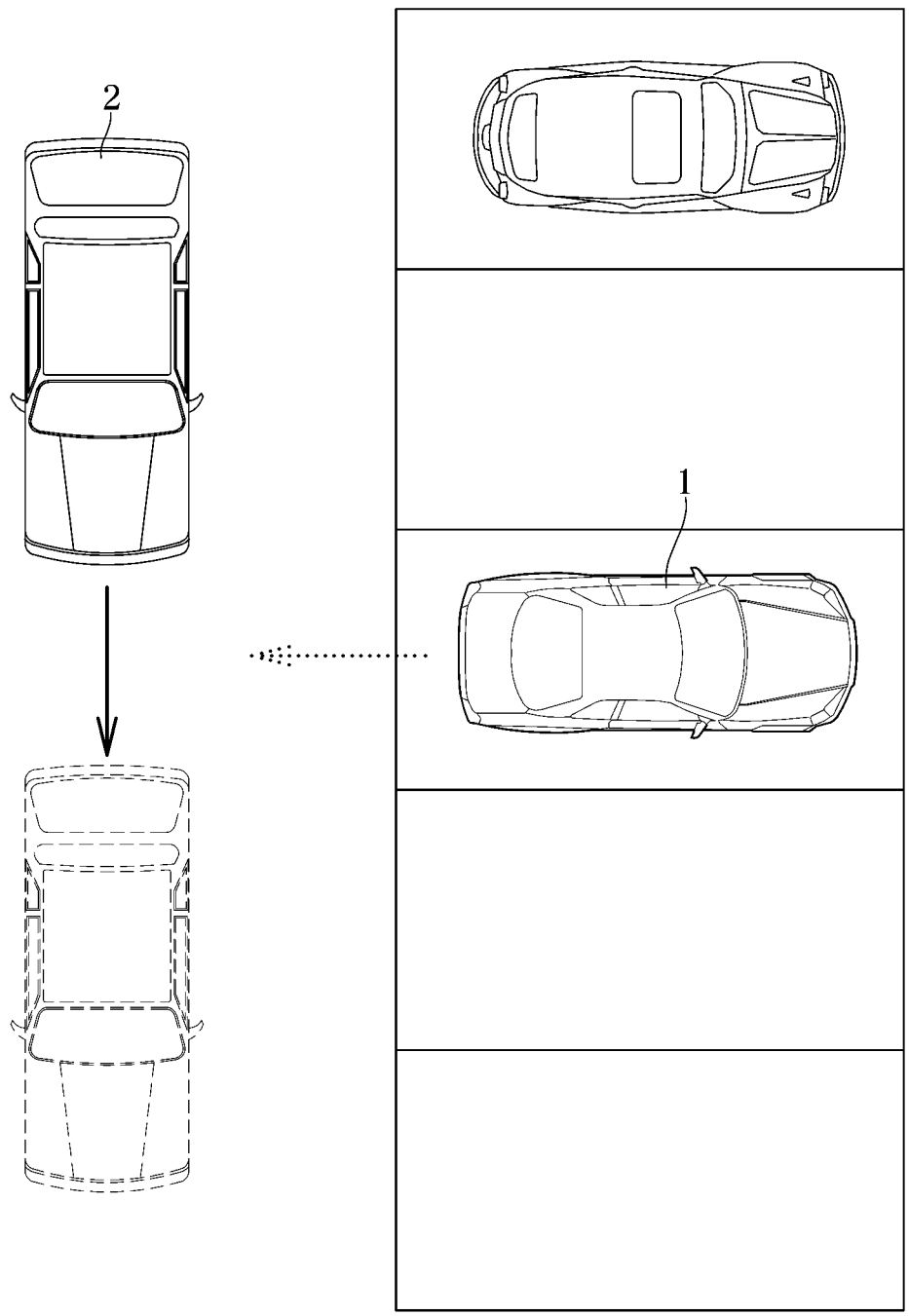
FIGS. 5 and 6 are views illustrating an example in which a driver assistance apparatus identifies a risk of collision between a vehicle and a rear side object according to an embodiment.
Figure 6:
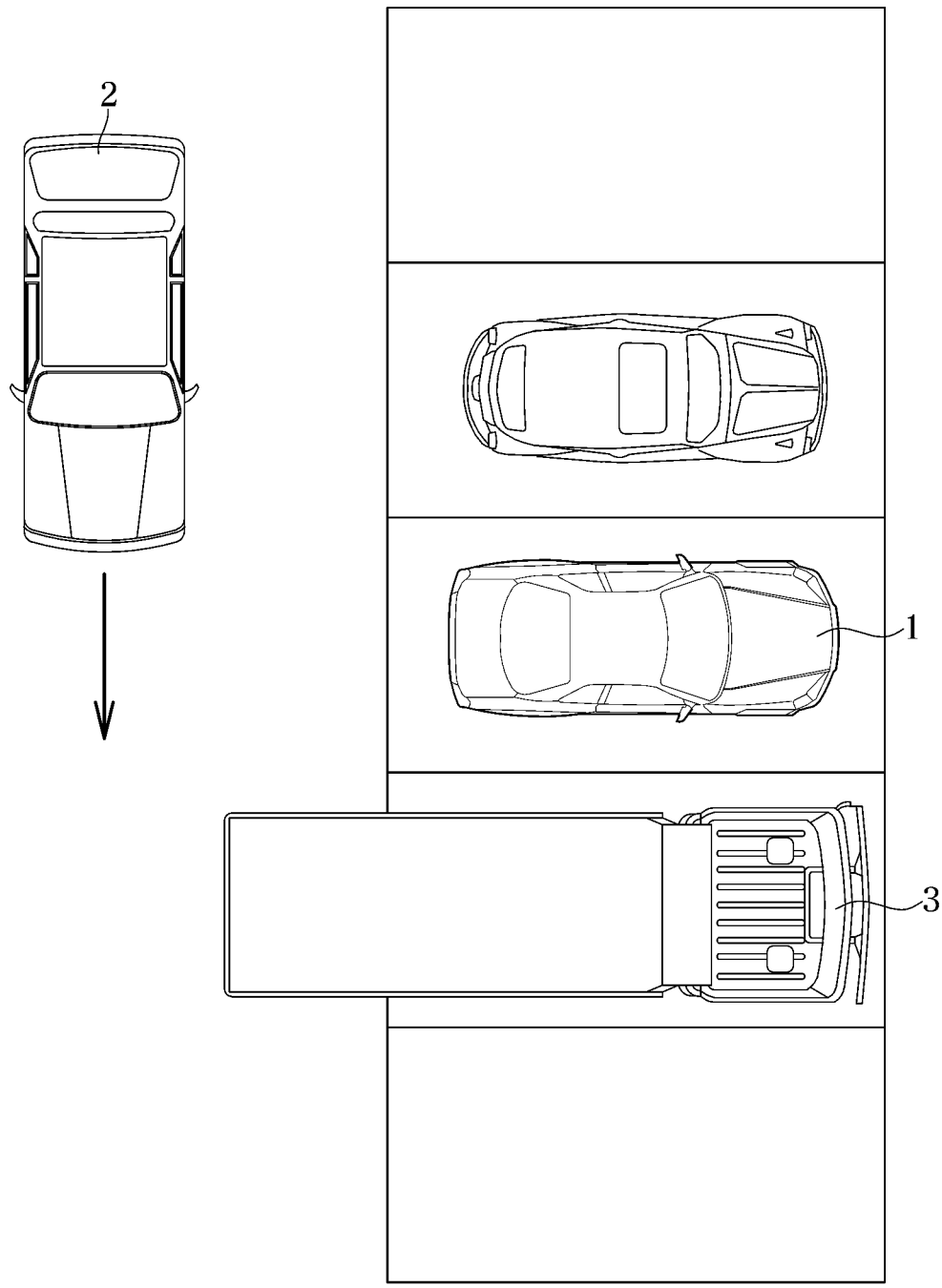
Figure 7:
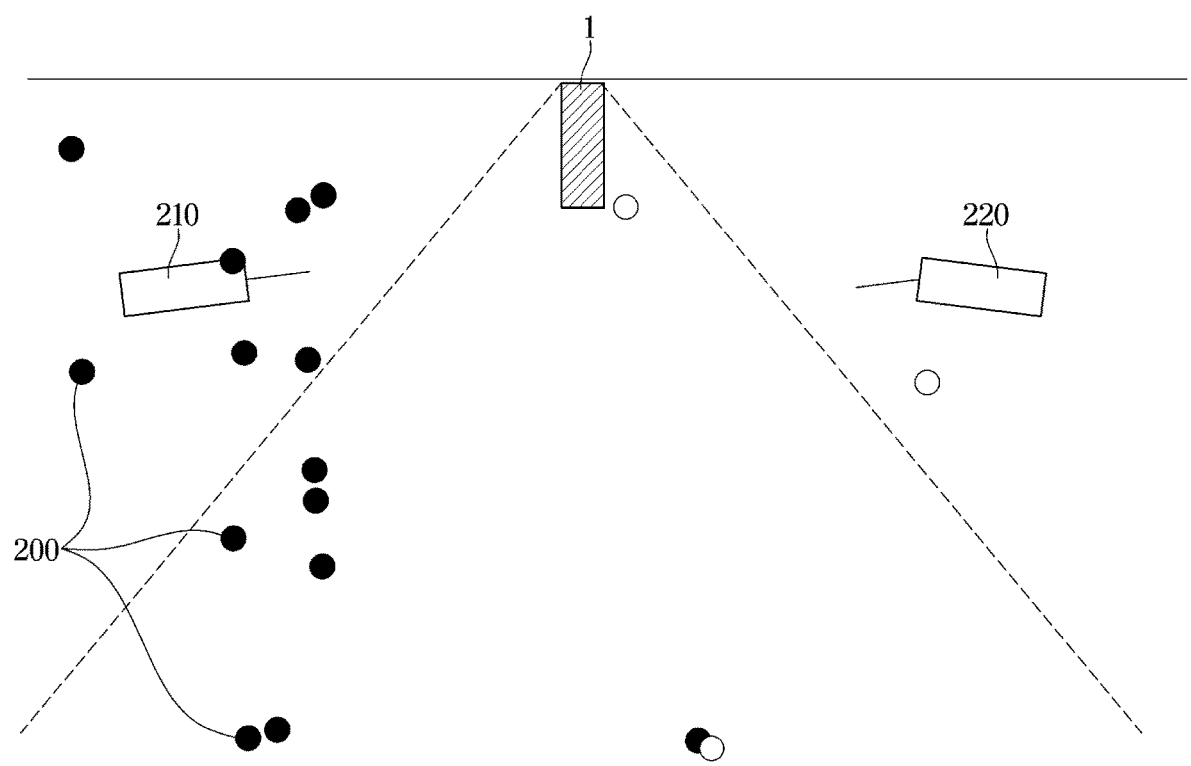
FIG. 7 is a view illustrating that a driver assistance apparatus obtains information by detecting data according to an embodiment.
Figure 8:
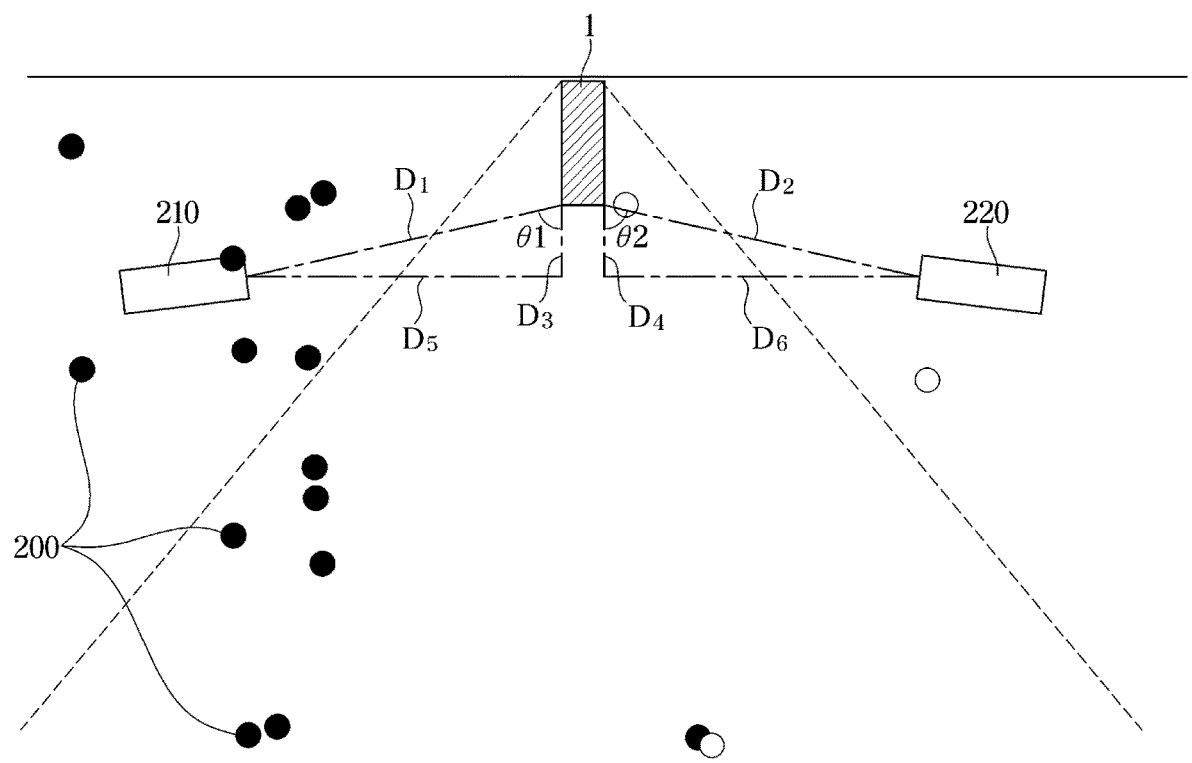
FIG. 8 is a view illustrating that a driver assistance apparatus actually identifies another vehicle based on detecting data according to an embodiment.

FIG. 1 is a view illustrating a configuration of a vehicle according to an embodiment. FIG. 2 is a view illustrating an exterior of a vehicle according to an embodiment. FIGS. 3 and 4 are views illustrating an operation of a radar included in a driver assistance apparatus according to an embodiment. FIGS. 5 and 6 are views illustrating an example in which a driver assistance apparatus identifies a risk of collision between a vehicle and a rear side object according to an embodiment. FIG. 7 is a view illustrating that a driver assistance apparatus obtains information by detecting data according to an embodiment. FIG. 8 is a view illustrating that a driver assistance apparatus actually identifies another vehicle based on detecting data according to an embodiment.

Referring to FIGS. 1 to 8, a vehicle 1 may include a cluster 10 for displaying operation information of the vehicle 1, a side mirror indicator 20 for warning an object located on a rear side of the vehicle 1, a multimedia device 30 for playing music and images, a power steering 40 for assisting a driver's steering, and a driver assistance apparatus 100 for assisting the driver.

The cluster 10 displays driving information of the vehicle 1 including a driving speed of the vehicle 1, a RPM of an engine and/or an amount of fuel, and may be located in front of the driver as illustrated in FIG. 4. The cluster 10 may display information about an emergency situation such as a risk of collision of the vehicle 1 in response to a control request from the driver assistance apparatus 100.

The multimedia device 30 may include a display 31 for displaying an image (or moving image) for the driver's convenience and fun, and a speaker 32 for outputting a sound for the driver's convenience and fun. The display 31 may display an image message regarding the emergency situation such as the risk of collision of the vehicle 1 in response to the control request from the driver assistance apparatus 100. The speaker 32 may display a sound message regarding the emergency situation such as the risk of collision of the vehicle 1 in response to the request from the driver assistance apparatus 100.

The power steering 40 may detect a driver's intention to steer through a steering wheel of the vehicle 1 and assist a steering of the vehicle 1 in response to the driver's intention to steer. In addition, the power steering 40 may provide a vibration of the steering wheel to warn of the emergency situation such as the risk of collision of the vehicle 1 in response to the control request from the driver assistance apparatus 100.

The driver assistance apparatus 100 may include a first radar sensor 110 installed at a left rear of the vehicle 1, a second radar sensor 120 installed at a right rear of the vehicle 1, an input switch 130 for activating and deactivation of driver assistance, and a controller 140 for controlling an operation of the driver assistance apparatus 100.

As illustrated in FIG. 2, the first radar sensor 110 may have a first field of sensing 110a facing a rear left side of the vehicle 1.

The first radar sensor 110 may include a transmission antenna module 111 (for example, a transmission antenna array) that radiates a frequency modulated continuous wave 112 toward the left rear of the vehicle 1, and a reception antenna module 121 (e.g., a reception antenna array) that receives a reflected radio wave 122 reflected from the object.

As illustrated in FIG. 4, the transmission antenna module 111 may include at least one antenna 111a, and the reception antenna module 121 may include a plurality of antennas 121a, 121b, 121C, and 121d. In the embodiment, the transmission antenna module 111 including the at least one antenna and the reception antenna module 121 including the plurality of antennas are described, but are not limited thereto. As described below, at least one of the transmission antenna module 111 and the reception antenna module 121 includes the plurality of antennas in order to identify a relative direction of the object. Accordingly, the transmission antenna module 111 may include the plurality of antennas, and the reception antenna module 121 may include the at least one antenna.

The transmission antenna module 111 may be disposed on a virtual line in which the plurality of antennas included in the transmission antenna module 111 are arranged, or may be disposed on a virtual line approximately perpendicular to the virtual line in which the plurality of antennas are arranged.

The transmission antenna module 111 may emit the frequency modulated continuous wave 112 in response to a control signal from the controller 140. The transmission antenna module 111 may transmit, for example, the frequency modulated continuous wave (FMCW) 112 whose frequency linearly changes over time as illustrated in FIG. 3. A frequency of the frequency modulated continuous wave 112 may repeat linearly increasing and decreasing over time within a predetermined range.

The reception antenna module 121 may receive the reflected radio wave 122 in which the frequency modulated continuous wave 112 emitted by the transmission antenna module 111 is reflected from the object (e.g., another vehicles, pedestrians, bicycles, road structures, etc.).

The reception antenna module 121 may receive, for example, the reflected radio wave 122 whose frequency is linearly changed over time as illustrated in FIG. 3. Like the frequency of the frequency modulated continuous wave 112, a frequency of the reflected radio wave 122 may repeat linearly increasing and decreasing over time within the predetermined range. As such, the reflected radio wave 122 may be received by the reception antenna module 121 by reflecting the frequency modulated continuous wave 112 emitted by the transmission antenna module 111 to the object. Therefore, since the reflected radio wave 122 received by the reception antenna module 121 is derived from the frequency modulated continuous wave 112 emitted by the transmission antenna module 111 before a time of reception, the frequency of the received reflected radio wave 122 by the reception antenna module 121 is different from the frequency of the reflected radio wave 122 currently emitted by the transmission antenna module 111. In addition, a difference between the frequency of the reflected radio wave 122 received by the reception antenna module 121 and the frequency of the frequency modulated continuous wave 112 currently emitted by the transmission antenna module 111 may depend on a distance from the first radar sensor 110 to the object.

The first radar sensor 110 may be electrically connected to the controller 140 through, for example, a vehicle communication network NT, a hard wire, or a printed circuit board. The first radar sensor 110 may provide detecting data including information about the frequency of the reflected radio wave 122 received by the reception antenna module 121 and information about the frequency of the frequency modulated continuous wave 112 currently emitted by the transmission antenna module 111 to the controller 140.

As described below, the controller 140 may identify a distance from the first radar sensor 110 to the object based on the detecting data. An operation of the controller 140 is described in more detail below.

The second radar sensor 120 may have a second field of sensing 120a facing the rear right side of the vehicle 1 as illustrated in FIG. 2.

The first radar sensor 110 may include a transmission antenna module 111 (for example, a transmission antenna array) that radiates a frequency modulated continuous wave 112 toward the left rear of the vehicle 1, and a reception antenna module 121 (e.g., a reception antenna array) that receives a reflected radio wave 122 reflected from the object.

The second radar sensor 120 may include a transmission antenna (or a transmission antenna array) that radiates the frequency modulated continuous wave toward a right rear of the vehicle 1, and a plurality of reception antennas (or reception antenna arrays). A structure and a function of the transmission antenna and the reception antenna of the second radar sensor 120 are substantially the same as the transmission antenna module 111 and the reception antenna module 121a, 121b, 121C, and 121d of the first radar sensor 110 described above. Therefore, a description of the transmission antenna and the reception antenna of the second radar sensor 120 will be replaced with the description of the transmission antenna module 111 and the reception antenna module 121a, 121b, 121C, 121d of the first radar sensor 110.

The input switch 130 may obtain a driver's input for activating or deactivating the operation of the driver assistance apparatus 100. The input switch 130 may be installed on the steering wheel, for example. In addition, the input switch 130 may include, for example, a tact switch, a push switch, a slide switch, a toggle switch, a micro switch, or a touch switch.

The controller 140 may be electrically connected to the first radar sensor 110, the second radar sensor 120, and the input switch 130. In addition, the controller 140 may be connected to the cluster 10 of the vehicle 1, the side mirror indicator 20, the multimedia device 30, and the power steering 40 through the vehicle communication network NT.

The controller 140 may include a processor 141 and a memory 142. The controller 140 may include, for example, one or more processors or one or more memories. Each of the processor 141 and the memory 142 may be implemented as a separate semiconductor device, or may be implemented as a single semiconductor device.

The processor 141 may process the detecting data of the first radar sensor 110 and the detecting data of the second radar sensor 120 and provide the control signal for controlling the operation of the driver assistance apparatus 100.

The processor 141 may include one chip (or core) or may include a plurality of chips (or cores). For example, the processor 141 may include a digital signal processor that processes the detecting data of the first and second radars 110 and 120, and/or a micro control unit (MCU) that generates a driving signal/braking signal/steering signal.

The processor 141 may identify the object (for example, another vehicles, pedestrians, cyclists, etc.) in the rear side (left rear or right rear) of the vehicle 1 based on the detecting data of the first radar sensor 110 and the second radar sensor 120.

Further, the processor 141 may identify a distance between the vehicle 1 and the object (hereinafter referred to as a "relative distance"), a direction in which the object is located with respect to the vehicle 1 (hereinafter referred to as a "relative direction"), and a relative moving speed of the object with respect to the vehicle 1 (hereinafter referred to as a "relative speed") based on the detecting data of the first radar sensor 110 and the second radar sensor 120.

As described above, the first radar sensor 110 and the second radar sensor 120 operate in the FMCW method. The processor 141 may identify the relative distance based on the frequency of the frequency modulated continuous wave 112 emitted by the transmission antenna module 111 and the frequency of the reflected radio wave 122 received by the reception antenna module 121.

First, the operation by the first radar sensor 110 will be described.

For example, the transmission antenna module 111 may emit a radio wave of a frequency F1 at a time T1 of FIG. 3, and reception antenna module 121 may receive a radio wave of a frequency F2 at a time T2.

A time ΔT from which the radio wave of the frequency F1 is emitted and reflected by the object to be received may be obtained by a difference between the time T1 at which the radio wave of the frequency F1 is emitted and the time T2 at which the radio wave of the frequency F1 is received.

By the difference between the frequency F1 of the frequency modulated continuous wave and the frequency F2 of the received radio wave at the time T2, a frequency change ΔF from which the radio wave of the frequency F1 is emitted and reflected by the object to be received may be obtained.

In FIG. 3, during a modulation period Tm in which the frequency of the frequency modulated continuous wave is periodically modulated, a frequency modulation rate Fr of the frequency modulated continuous wave may be obtained from a modulation width Fw of a predetermined frequency and a predetermined modulation period Tm. Particularly, the frequency modulation rate Fr may be obtained by $<2*Fw/Tm>$.

In this case, the frequency modulation rate Fr may be equal to the ratio of the frequency change ΔF during the time ΔT between the time T1 and the time T2, that is, $<\Delta F/\Delta T>$. In other words, [Equation 1] is established.

$$2*Fw/Tm = \Delta F/\Delta T \qquad \text{[Equation 1]}$$

Here, Fw denotes the modulation width of the predetermined frequency, Tm denotes the predetermined modulation period of the frequency, ΔT denotes the time from which the radio wave is emitted and reflected by the object to be received, and ΔF represents the change in frequency during ΔT.

Since ΔT represents the time from which the radio wave is emitted and reflected by the object to be received, ΔT may be expressed from a distance R from the radar sensor (or vehicle) to the object and a speed c of radio waves (light). Particularly, the time ΔT may be expressed as [Equation 2].

$$\Delta T = 2*R/c \qquad \text{[Equation 2]}$$

The distance R from the radar sensor (or vehicle) to the object may be expressed as [Equation 3] by substituting [Equation 2] into [Equation 1].

$$R = c*\Delta F*Tm/(4*Fw) \qquad \text{[Equation 3]}$$

Here, c denotes the speed of the radio wave, ΔF denotes the change in frequency during ΔT, Tm denotes the predetermined modulation period of the frequency, and Fw denotes the modulation width of the predetermined frequency.

The processor 141 may obtain the distance R from the first radar sensor 110 to the object based on the detecting data obtained from the first radar sensor 110. Particularly, the processor 141 may obtain the distance R from the first radar sensor 110 to the object using the difference ΔF between the frequency of the reflected radio wave 122 received by the reception antenna module 121 and the frequency of the frequency modulated continuous wave 112 currently emitted by the transmission antenna module 111 and [Equation 3].

In addition, the reception antenna module 121 may include a plurality of antennas 121a, 121b, 121C, and 121d, and each of the plurality of antennas 121a, 121b, 121C, and 121d may independently receive the reflected radio wave, and may provide information about the frequency of the reflected radio wave 122 to the controller 140.

Accordingly, the processor 141 may identify a distance between each of the plurality of antennas 121a, 121b, 121C, and 121d and the object based on the frequency of the reflected radio wave 122. For example, as illustrated in FIG. 4, the processor 141 may identify a first distance R1 between the first reception antenna 121a and the object, and a second distance R2 between the second reception antenna 121b and the object, a third distance R3 between the third receiving antenna 121C and the object, and a fourth distance R4 between the fourth reception antenna 121d and the object. Also, the processor 141 may identify the relative position of the object with respect to the vehicle 1 based on the first distance R1, the second distance R2, the third distance R3, and the fourth distance R4.

The processor 141 may identify the relative direction of the object based on a phase difference between reflected radio waves received by the plurality of antennas 121a, 121b, 121C, and 121d. The relative direction may be expressed as an angle at which the reflected radio wave 122 is received, that is, an angle of arrival (AOA) with respect to a main direction in which the first radar sensor 110 transmits the frequency modulated continuous wave 112.

The relative direction (or angle of arrival) may be obtained from a small change in the distance to the object resulting in a phase change of the reflected radio wave 122. For example, a difference between the distance R1 between the first reception antenna 121a and the object and the distance R2 between the second reception antenna 121b and the object may result in the phase difference between the reflected radio wave received by the first reception antenna 121a and the reflected radio wave received by the second reception antenna 121b.

The phase difference (ΔΦ) may be expressed as [Equation 4].

$$\Delta\Phi = \frac{2\pi\Delta d}{\lambda} \qquad \text{[Equation 4]}$$

Here, ΔΦ denotes the phase difference between the reception antennas, Δd denotes the difference in distance from the object to the reception antennas, and λ denotes a wavelength of the radio wave.

The processor 141 may identify the angle of arrival using the phase difference and the distance between the reception antennas. For example, the processor 141 may identify the angle of arrival using [Equation 5].

$$\theta = \sin^{-1}\left(\frac{\lambda\Delta\Phi}{2\pi l}\right) \qquad \text{[Equation 5]}$$

Here, θ denotes the angle of arrival, λ denotes the wavelength of the radio wave, ΔΦ denotes the phase difference between reception antennas, and l represents the distance between reception antennas.

Also, the processor 141 may obtain the relative speed of the object using a Doppler effect. For example, the frequency of the reflected radio wave 122 may change according to the relative speed of the object.

In order to identify the relative speed of the object, the first radar sensor 110 and the second radar sensor 120 may emit the frequency modulated continuous wave 112 having different modulation rates. For example, the first radar sensor 110 and the second radar sensor 120 may emit a first frequency modulated continuous wave having a first modulation rate Fr1 during a first modulation period Tm1, and may emit a second frequency modulated continuous wave having a second modulation rate Fr2 during a second modulation period Tm2.

The processor 141 may identify the frequency change of the reflected radio wave due to the Doppler effect based on the frequency of the reflected radio wave by a first chirp and the frequency of the reflected radio wave by a second chirp, and may identify the relative speed of the object based on the frequency change of the reflected radio wave due to the Doppler effect.

In this way, the processor 141 may identify the relative distance, the relative direction (angle of arrival), and the relative speed of the object located in the first field of sensing 110a (left rear of the vehicle) of the first radar sensor 110 based on the detecting data of the first radar sensor 110.

In the same way, the processor 141 may identify the relative distance, the relative direction (angle of arrival), and the relative speed of the object located in the second field of sensing 120a (right rear of the vehicle) of the second radar sensor 110 based on the detecting data of the second radar sensor 120.

The memory 142 may store or memorize programs and data for processing the detection data of the first and second radar sensors 110 and 120 and controlling the operation of the driver assistance apparatus 100.

The memory 142 may include a volatile memory, such as a Static Random Access Memory (S-RAM) and a Dynamic Random Access Memory (D-RAM), and a non-volatile memory, such as a Read Only Memory (ROM) and an Erasable Programmable Read Only Memory (EPROM). The memory 142 may include one memory device or may include a plurality of memory devices.

As described above, the controller 140 may obtain information about the object located at the rear side of the vehicle 1 by the programs and data stored in the memory 142 and the operation of the processor 141.

In addition, the controller 140 may provide information about the risk of collision between the vehicle 1 and the rear side object to the driver based on information about the object located at the rear side of the vehicle 1.

For example, as illustrated in FIG. 5, the vehicle 1 may be separated from a parking space by manipulating the driver. At this time, another vehicle 2 (or pedestrians, cyclists, or pets, etc.) may pass through a driving path of the vehicle 1. It may be difficult for the driver to identify another vehicle 2 due to vehicles parked next to the vehicle 1.

The controller 140 may provide information about the risk of collision between the vehicle 1 and the rear side object to the driver based on information about the object located at the rear side of the vehicle 1. For example, the controller 140 may control the cluster 10 to display a warning message or may transmit a message to the cluster 10. The controller 140 may control the side mirror indicator 20 to emit light from the side mirror indicator 20. The controller 140 may control the multimedia device 30 to display the warning image or output a warning sound, or control the power steering 40 to generate the vibration in the steering wheel.

In this case, when a large vehicle, for example, a truck or a bus, is parked next to the vehicle 1, the controller 140 may erroneously detect another vehicle 2.

For example, as illustrated in FIG. 6, another vehicle 2 may be located in the first field of sensing 110a of the first radar sensor 110. The first radar sensor 110 may provide detecting data for detecting another vehicle 2 to the controller 140.

At this time, only a parked vehicle 3 may be located within the second field of sensing 120a of the second radar sensor 120. However, the second radar sensor 120 may erroneously detect that another vehicle 2 is located in the second field of sensing 120a. The frequency modulated continuous wave emitted from the second radar sensor 120 may reach another vehicle 2 while driving. In addition, the frequency modulated continuous wave that reaches another vehicle 2 may be reflected by another vehicle 2, and the reflected radio wave reflected by another vehicle 2 may be received by the second radar sensor 120 after being reflected by the parked vehicle 3.

In this way, the second radar sensor 120 may receive a reflected signal reflected from the parked vehicle 3, and detecting data corresponding to the reflected radio wave successively reflected from another vehicle 2 and the parked vehicle 3 may be provided to the controller 140.

The controller 140 may erroneously detect a virtual vehicle driving in a direction opposite to another vehicle 2 within the second field of sensing 120a of the second radar sensor 120.

The erroneous detection may cause confusion for the driver, and may cause a collision between the vehicle 1 and another vehicle 2.

The controller 140 may prevent erroneous detection due to reflection of the radio wave.

The controller 140 may identify a plurality of detection points 200 and a plurality of tracks 210 and 220 as illustrated in FIG. 7 based on the detecting data of the first and second radar sensors 110 and 120. The plurality of detection points 200 may indicate positions of the detecting data, in particular those reflecting radio waves by the reflected radio wave (which may be an existing object or a non-existent detection error).

The controller 140 may generate the tracks 210 and 220 based on the plurality of detection points 200. For example, when the plurality of detection points 200 are concentrated to form a specific shape (e.g., a shape of the vehicle), the controller 140 may generate the tracks 210 and 220 therefrom.

As illustrated in FIG. 7, the controller 140 may generate the first track 210 corresponding to the another vehicle 2 illustrated in FIG. 6 and the second track 220 that is erroneously detected by reflection of the radio wave.

The first track 210 corresponding to the another vehicle 2 and the second track 220 erroneously detected by reflection of the radio wave may have a specific relationship.

For example, a position of the second track 220 may be approximately symmetrical to a position of the first track 210 around the vehicle 1 (more precisely, around an imaginary straight line indicating the driving direction of the vehicle). The first track 210 and the second track 220 may be located on the same line orthogonal to the driving direction of the vehicle 1.

Further, a movement of the second track 220 may be substantially symmetrical with the movement of the first track 210 around the vehicle 1 (more precisely, around imaginary straight line indicating the driving direction of the vehicle). The relative speed of the second track 220 may be approximately the same as the relative speed of the first track 210.

In order to identify whether any one of the first track 210 and the second track 220 is a track erroneously detected by the reflection of the radio wave, the controller 140 may identify whether the first track 210 and the second track 220 are located on the same line orthogonal to the driving direction of the vehicle 1.

The controller 140 may identify a longitudinal distance from the vehicle 1 to the first track 210 (the shortest distance from the vehicle to the virtual straight line perpendicular to the driving direction of the vehicle and passing through the first track).

As illustrated in FIG. 8, the controller 140 may determine a longitudinal distance D3 from the vehicle 1 to the first track 210 using the shortest distance D1 from the vehicle 1 to the first track 210, an angle Θ1 between the driving direction of the vehicle 1 and the relative direction of the first track 210, and [Equation 6].

$$D3=D1*\cos \Theta 1 \quad\quad\quad [\text{Equation 6}]$$

Here, D3 denotes the longitudinal distance from the vehicle 1 to the first track 210, D1 denotes the shortest distance from the vehicle 1 to the first track 210, and Θ1 denotes the angle between the driving direction of the vehicle 1 and the relative direction of the first track 210.

In the same manner, the controller 140 may determine a longitudinal distance D4 from the vehicle 1 to the second track 212 using the shortest distance D2 from the vehicle 1 to the second track 220, an angle Θ2 between the driving direction of the vehicle 1 and the relative direction of the second track 212, and [Equation 6].

The controller 140 may identify whether the difference between the longitudinal distance D3 up to the first track 210 and the longitudinal distance D4 up to the second track 220 is within an error range (e.g., ½ of a width of the first track or ½ of a width of the second track).

When the difference between the longitudinal distance D3 up to the first track 210 and the longitudinal distance D4 up to the second track 220 is within the error range, the controller 140 may determine that the first track 210 and the second track 220 are located on the same line perpendicular to the driving direction of the vehicle 1.

In order to identify whether any one of the first track 210 and the second track 220 is a track erroneously detected by the reflection of the radio wave, the controller 140 may identify whether a moving speed V1 of the first track 210 is approximately equal to a moving speed V2 of the second track 220.

The controller 140 may identify a transverse distance from the vehicle 1 to the first track 210 (the shortest distance from the vehicle to the virtual straight line that is parallel to the driving direction of the vehicle and passes through the first track).

As illustrated in FIG. 8, the controller 140 may determine a transverse distance D5 from the vehicle 1 to the first track 210 using the shortest distance D1 from the vehicle 1 to the first track 210, an angle Θ1 between the driving direction of the vehicle 1 and the relative direction of the first track 210, and [Equation 7].

$$D5=D1*\sin \Theta 1 \quad\quad\quad [\text{Equation 7}]$$

Here, D5 denotes the transverse distance from the vehicle 1 to the first track 210, D1 denotes the shortest distance from the vehicle 1 to the first track 210, and Θ1 denotes the angle between the driving direction of the vehicle 1 and the relative direction of the first track 210.

The controller 140 may determine the transverse moving speed V1 of the first track 210 based on a change in the transverse distance up to the first track 210 according to a change in time.

In the same manner, the controller 140 may determine a transverse distance D6 from the vehicle 1 to the second track 212 using the shortest distance D2 from the vehicle 1 to the second track 220, an angle Θ2 between the driving direction of the vehicle 1 and the relative direction of the second track 212, and [Equation 6]. In addition, the controller 140 may determine the transverse moving speed V2 of the second track 220 based on the change in the transverse distance to the second track 220 according to the change in time.

The controller 140 may identify whether the difference between the transverse moving speed V1 up to the first track 210 and a transverse moving speed D6 up to the second track 220 is within the error range.

When the difference between the transverse moving speed V1 up to the first track 210 and the transverse moving speed D6 up to the second track 220 is within the error range, the controller 140 may determine that the moving speed V1 of the first track 210 is approximately equal to the moving speed V2 of the second track 220.

When the first track 210 and the second track 220 are located on the same line perpendicular to the driving direction of the vehicle 1, and the moving speed V1 of the first track 210 is approximately the same as the moving speed V2 of the second track 220, the controller 140 may determine that any one of the first track 210 and the second track 220 is a track erroneously detected by the reflection of the radio wave.

The controller 140 may identify which of the first track 210 and the second track 220 is a track corresponding to the missing another vehicle 2 based on a comparison between the number of detection points constituting the first track 210 and the number of detection points constituting the second track 220.

As illustrated in FIG. 7, a large number of detection points are detected in and around an existing another vehicle 2.

Therefore, the controller 140 may determine a track with a large number of detection points constituting the track as a track corresponding to the existing another vehicle 2, and may determine a track with a small number of detection points as an erroneous detected track. For example, when the number of detection points constituting the first track 210 is greater than the number of detection points constituting the second track 220, the controller 140 may determine the second track 220 as the erroneously detected track.

The controller 140 may ignore the erroneously detected track and warn the driver of an existence of the rear side object and the risk of collision according to the position of the track corresponding to the existing another vehicle 2.

Figure 9:
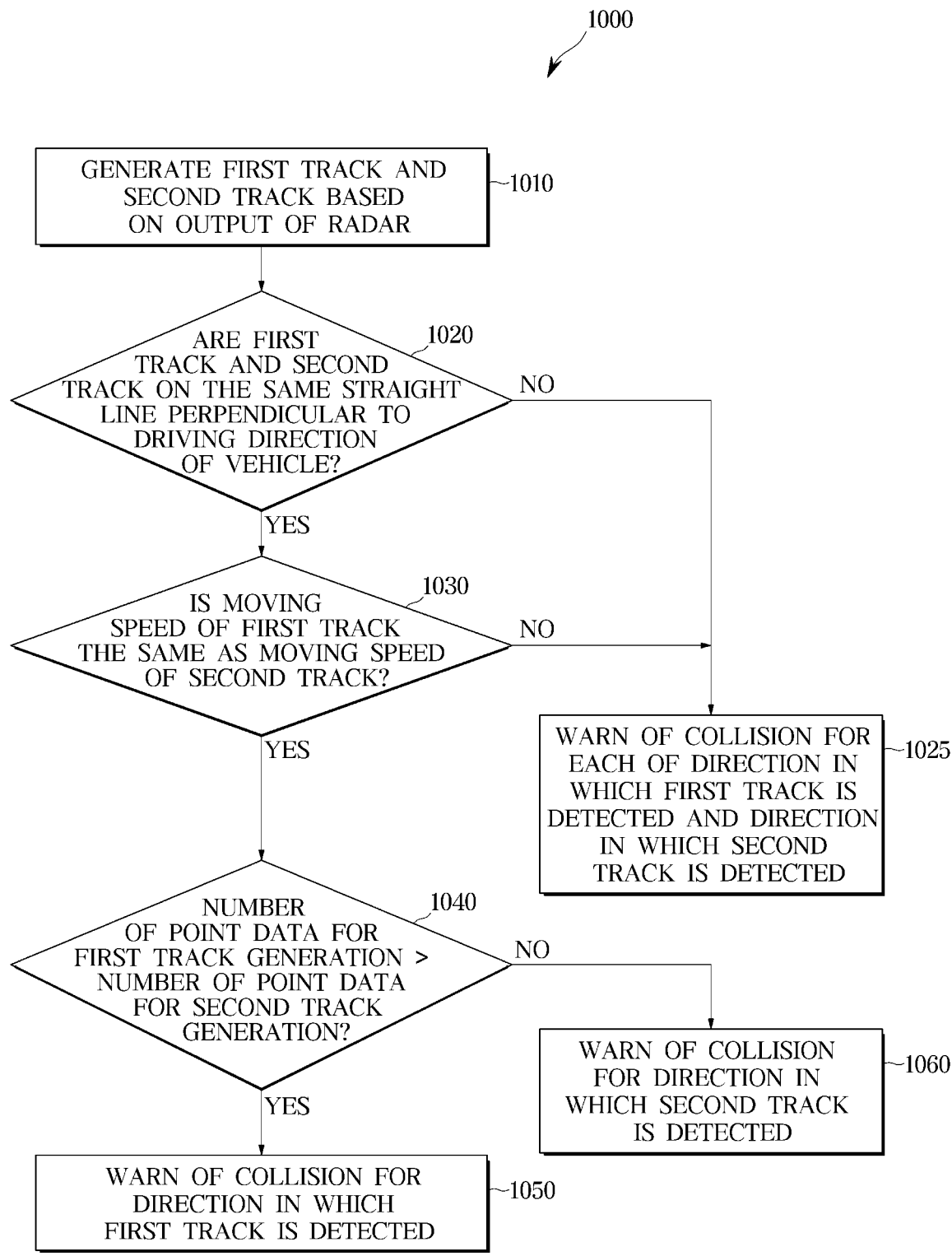
FIG. 9 is a view illustrating an operation of a driver assistance apparatus according to an embodiment.

FIG. 9 is a view illustrating an operation of a driver assistance apparatus according to an embodiment.

Referring to FIG. 9, an operation 1000 of the driver assistance apparatus 100 will be described.

The driver assistance apparatus 100 may generate the first track 210 and the second track 220 based on the detecting data of the first radar sensor 110 and the second radar sensor 120 (1010).

The controller 140 of the driver assistance apparatus 100 may generate the detection point based on the detecting data received from the first radar sensor 110 and generate the first track 210 based on the detection point. In addition, the controller 140 may generate the detection point based on the detecting data received from the second radar sensor 120 and generate the second track 220 based on the detection point.

The driver assistance apparatus 100 may identify whether the first track 210 and the second track 220 are located on the same line perpendicular to the driving direction of the vehicle 1 (1020).

The controller 140 may determine the longitudinal distance from the vehicle 1 to the first track 210 based on the shortest distance between the vehicle 1 and the first track 210 and the angle between the driving direction of the vehicle 1 and the relative direction of the first track 210.

The controller 140 may determine the longitudinal distance from the vehicle 1 to the second track 220 based on the shortest distance between the vehicle 1 and the second track 220 and the angle between the driving direction of the vehicle 1 and the relative direction of the second track 220.

In addition, when the difference between the longitudinal distance up to the first track 210 and the longitudinal distance up to the second track 220 is within the error range, the controller 140 may identify that the first track 210 and the second track 220 are located on the same line perpendicular to the driving direction of the vehicle 1.

When the first track 210 and the second track 220 are not located on the same line perpendicular to the driving direction of the vehicle 1 (NO in 1020), the driver assistance apparatus 100 may warn of the collision between the direction in which the first track 210 is located and the direction in which the second track 220 is located (1025).

When the first track 210 and the second track 220 are not located on the same line perpendicular to the driving direction of the vehicle 1, the controller 140 may determine that both the first track 210 and the second track 220 represent the existing another vehicle.

Therefore, the controller 140 may transmit a message to at least one of the cluster 10, the side mirror indicator 20, the multimedia device 30, and the power steering 40 to warn of the collision between the direction in which the first track 210 is located and the direction in which the second track 220 is located.

When the first track 210 and the second track 220 are located on the same line perpendicular to the driving direction of the vehicle 1 (YES in 1020), the driver assistance apparatus 100 may identify whether the moving speed of the first track 210 is approximately equal to the moving speed of the second track 220 (1030).

The controller 140 may determine the transverse distance from the vehicle 1 to the first track 210 based on the shortest distance between the vehicle 1 and the first track 210 and the angle between the driving direction of the vehicle 1 and the relative direction of the first track 210. The controller 140 may determine the moving speed of the first track 210 based on the change in the transverse distance to the first track 210.

The controller 140 may determine the transverse distance from the vehicle 1 to the second track 220 based on the shortest distance between the vehicle 1 and the second track 220 and the angle between the driving direction of the vehicle 1 and the relative direction of the second track 220. The controller 140 may determine the moving speed of the second track 220 based on the change in the transverse distance to the second track 220.

In addition, when the difference between the moving speed of the second track 220 and the moving speed of the second track 220 is within the error range, the controller 140 may identify the moving speed of the first track 210 is approximately the same as the moving speed of the second track 220.

When the moving speed of the first track 210 is not approximately the same as the moving speed of the second track 220 (NO in 1030), the driver assistance apparatus 100 may warn of the collision between the direction in which the first track 210 is located the direction in which the second track 220 is located (1025).

When the moving speed of the first track 210 is approximately the same as the moving speed of the second track 220 (YES in 1030), the driver assistance apparatus 100 may identify whether the number of detection points related to the first track 210 is greater than the number of detection points related to the track 220 (1040).

When the first track 210 and the second track 220 are located on the same line perpendicular to the driving direction of the vehicle 1 and the moving speed of the first track 210 is approximately the same as the moving speed of the second track 220, the controller 140 may identify that any one of the first track 210 and the second track 220 is erroneously detected by reflection of the radio wave.

The controller 140 may compare the number of detection points related to the first track 210 with the number of detection points related to the second track 220 to identify which one of the first track 210 and the second track 220 is erroneous detected.

When the number of detection points related to the first track 210 is greater than the number of detection points related to the second track 220 (YES in 1040), the driver assistance apparatus 100 may warn of the collision in the direction in which the first track 210 is located (1050).

When the number of detection points related to the first track 210 is greater than the number of detection points related to the second track 220, the controller 140 may correspond to another vehicle 2 where the first track 210 is missing, and the second track 220 may be determined as a false detection due to reflection of the radio wave.

Therefore, the controller 140 may transmit the message to at least one of the cluster 10, the side mirror indicator 20, the multimedia device 30, and the power steering 40 to warn of the collision in the direction in which the first track 210 is located.

When the number of detection points related to the first track 210 is not greater than the number of detection points related to the second track 220 (NO in 1040), the driver assistance apparatus 100 may warn of the collision in the direction in which the second track 220 is located (1060).

When the number of detection points related to the second track 220 is greater than the number of detection points related to the first track 210, the controller 140 may correspond to another vehicle 2 where the first track 210 is missing, and the second track 220 may be determined as the false detection due to reflection of the radio wave.

Therefore, the controller 140 may transmit the message to at least one of the cluster 10, the side mirror indicator 20, the multimedia device 30, and the power steering 40 to warn of the collision in the direction in which the second track 220 is located.

As described above, the driver assistance apparatus 100 may identify the tracks that are erroneously detected by reflection of the radio wave based on the positions and movements of the tracks, and may not generate a collision warning for the erroneously detected tracks.

According to the embodiment of the disclosure, it is possible to provide the driver assistance apparatus capable of assisting the driver while the vehicle is leaving the parking space, the vehicle having the same, and the method of controlling the vehicle.

According to the embodiment of the disclosure, it is possible to provide the driver assistance apparatus capable of preventing the vehicle from colliding in the rear side while the vehicle is departing from the parking space, the vehicle having the same, and the method of controlling the vehicle.

According to an aspect of the disclosed invention, it is possible to provide a driver assistance apparatus, a vehicle, and a control method thereof capable of preventing an erroneous warning of the rear side collision of the vehicle while the vehicle is departing from the parking space, the vehicle having the same, and the method of controlling the vehicle.

Exemplary embodiments of the present disclosure have been described above. In the exemplary embodiments described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above described exemplary embodiments, embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:

1. A driver assistance apparatus comprising:
   a first radar sensor mounted to a vehicle and having a view of a left rear side outside the vehicle, the first radar sensor configured to output first detecting data;
   a second radar sensor mounted to the vehicle and having a view of a right rear side outside the vehicle, the second radar sensor configured to output second detecting data; and
   a controller configured to:
   process the first detecting data and the second detecting data;
   generate a plurality of detection points based on processing of the first detecting data and the second detecting data;
   generate a first track and a second track based on the plurality of detection points,
   wherein the first track and the second track correspond to a first object external to the vehicle;
   identify a track that is normally detected and a track that is erroneously detected from among the first track and the second track, wherein the track that is normally detected corresponds to a track of the first object external to the vehicle and the track that is erroneously detected corresponds to one or more reflections of radio waves off of a second object external to the vehicle; and
   warn of a collision in a direction located on the normally detected track.

2. The driver assistance apparatus according to claim 1, wherein the controller is further configured to:
   identify a longitudinal distance of the first track based on a distance between the first track and the vehicle and an angle between a driving direction of the vehicle and a direction in which the first track is located; and identify a longitudinal distance of the second track based on a distance between the second track and the vehicle and an angle between the driving direction of the vehicle and a direction in which the second track is located.

3. The driver assistance apparatus according to claim 2, wherein the controller is further configured to identify that at least one of the first track and the second track is the erroneously detected track based on a difference between the longitudinal distance of the first track and the longitudinal distance of the second track being within an error range.

4. The driver assistance apparatus according to claim 3, wherein the controller is further configured to warn of the collision in the direction in which the first track is located based on the fact that a number of detection points related to the first track is greater than a number of detection points related to the second track.

5. The driver assistance apparatus according to claim 1, wherein the controller is further configured to:
identify a transverse moving speed of the first track based on a distance between the first track and the vehicle and an angle between a driving direction of the vehicle and a direction in which the first track is located, and
identify a transverse moving speed of the second track based on a distance between the second track and the vehicle and an angle between the driving direction of the vehicle and a direction in which the second track is located.

6. The driver assistance apparatus according to claim 5, wherein the controller is configured to identify that at least one of the first track and the second track is the erroneously detected track based on a difference between the transverse moving speed of the first track and the transverse moving speed of the second track being within an error range.

7. The driver assistance apparatus according to claim 6, wherein the controller is configured to warn of the collision in the direction in which the first track is located based on the fact that a number of detection points related to the first track is greater than a number of detection points related to the second track.

8. A vehicle comprising:
a cluster;
a side mirror indicator; and
a driver assistance apparatus configured to control the cluster and the side mirror indicator, wherein the driver assistance apparatus comprises:
a first radar sensor mounted to the vehicle and having a view of a left rear side outside the vehicle, the first radar sensor configured to output first detecting data;
a second radar sensor mounted to the vehicle and having a view of a right rear side outside the vehicle, the second radar sensor configured to output second detecting data; and
a controller configured to:
process the first detecting data and the second detecting data;
generate a plurality of detection points based on processing of the first detecting data and the second detecting data;
generate a first track and a second track based on the plurality of detection points, wherein the first track and the second track correspond to a first object external to the vehicle;
identify a track that is normally detected and a track that is erroneously detected from among the first track and the second track, wherein the track that is normally detected corresponds to a track of the first object external to the vehicle and the track that is erroneously detected corresponds to one or more reflections of radio waves off of a second object external to the vehicle; and
control at least one of the cluster and the side mirror indicator to warn of a collision in a direction located on the normally detected track.

9. The vehicle according to claim 8, wherein the controller is further configured to:
identify a longitudinal distance of the first track based on a distance between the first track and the vehicle and an angle between a driving direction of the vehicle and a direction in which the first track is located, and
identify a longitudinal distance of the second track based on a distance between the second track and the vehicle and an angle between the driving direction of the vehicle and a direction in which the second track is located.

10. The vehicle according to claim 9, wherein the controller is further configured to identify that at least one of the first track and the second track is the erroneously detected track based on a difference between the longitudinal distance of the first track and the longitudinal distance of the second track being within an error range.

11. The vehicle according to claim 10, wherein the controller is further configured to control at least one of the cluster and the side mirror indicator to warn of the collision in the direction in which the first track is located based on the fact that a number of detection points related to the first track is greater than a number of detection points related to the second track.

12. The vehicle according to claim 8, wherein the controller is further configured to:
identify a transverse moving speed of the first track based on a distance between the first track and the vehicle and an angle between a driving direction of the vehicle and a direction in which the first track is located, and
identify a transverse moving speed of the second track based on a distance between the second track and the vehicle and an angle between the driving direction of the vehicle and a direction in which the second track is located.

13. The vehicle according to claim 12, wherein the controller is further configured to identify that at least one of the first track and the second track is the erroneously detected track based on a difference between the transverse moving speed of the first track and the transverse moving speed of the second track being within an error range.

14. The vehicle according to claim 13, wherein the controller is further configured to control at least one of the cluster and the side mirror indicator to warn of the collision in the direction in which the first track is located based on the fact that a number of detection points related to the first track is greater than a number of detection points related to the second track.

15. A method of controlling a vehicle, the method comprising:
receiving first detecting data from a first radar sensor mounted to the vehicle and having a view of a left rear side outside the vehicle;
receiving second detecting data from a second radar sensor mounted to the vehicle and having a view of a right rear side outside the vehicle;
processing the first detecting data and the second detecting data;

generating a plurality of detection points based on processing of the first detecting data and the second detecting data;

generating a first track and a second track based on the plurality of detection points, wherein the first track and the second track correspond to a first object external to the vehicle;

identifying a track that is normally detected and a track that is erroneously detected from among the first track and the second track, wherein the track that is normally detected corresponds to a track of the first object external to the vehicle and the track that is erroneously detected corresponds to one or more reflections of radio waves off of a second object external to the vehicle; and warning of a collision in a direction located on the normally detected track.

16. The method according to claim 15, wherein identifying the track that is normally detected and the track that is erroneously detected comprises:

identifying a longitudinal distance of the first track based on a distance between the first track and the vehicle and an angle between a driving direction of the vehicle and a direction in which the first track is located; and identifying a longitudinal distance of the second track based on a distance between the second track and the vehicle and an angle between the driving direction of the vehicle and a direction in which the second track is located.

17. The method according to claim 16, wherein identifying the track that is normally detected and the track that is erroneously detected among the first track and the second track comprises identifying that at least one of the first track and the second track is the erroneously detected track based on a difference between the longitudinal distance of the first track and the longitudinal distance of the second track being within an error range.

18. The method according to claim 15, wherein identifying the track that is normally detected and the track that is erroneously detected among the first track and the second track comprises:

identifying a transverse moving speed of the first track based on a distance between the first track and the vehicle and an angle between a driving direction of the vehicle and a direction in which the first track is located; and identifying a transverse moving speed of the second track based on a distance between the second track and the vehicle and an angle between the driving direction of the vehicle and a direction in which the second track is located.

19. The method according to claim 18, wherein identifying the track that is normally detected and the track that is erroneously detected among the first track and the second track comprises identifying that at least one of the first track and the second track is the erroneously detected track based on a difference between the transverse moving speed of the first track and the transverse moving speed of the second track being within an error range.

20. The method according to claim 15, wherein warning of the collision in the direction located on the normally detected track comprises warning of the collision in the direction in which the first track is located based on the fact that a number of detection points related to the first track is greater than a number of detection points related to the second track.

* * * * *